United States Patent
Ojala et al.

(10) Patent No.: US 7,647,229 B2
(45) Date of Patent: Jan. 12, 2010

(54) TIME SCALING OF MULTI-CHANNEL AUDIO SIGNALS

(75) Inventors: Pasi Ojala, Kirkkonummi (FI); Ari Lakaniemi, Helsinki (FI); Jussi Virolainen, Espoo (FI)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 11/584,011

(22) Filed: Oct. 18, 2006

(65) Prior Publication Data

US 2008/0114606 A1  May 15, 2008

(51) Int. Cl.
*G10L 21/00* (2006.01)
(52) U.S. Cl. .................. 704/503; 704/500; 386/99; 386/101
(58) Field of Classification Search .............. 704/500, 704/503; 386/99, 101
See application file for complete search history.

(56) References Cited

U.S. PATENT DOCUMENTS

| | | | |
|---|---|---|---|
| 5,699,481 A | 12/1997 | Shlomot et al. | |
| 6,212,206 B1 | 4/2001 | Ketcham | |
| 6,728,678 B2 * | 4/2004 | Bhadkamkar et al. | 704/270 |
| 2004/0170385 A1 * | 9/2004 | Bhadkamkar et al. | 386/68 |
| 2005/0055204 A1 | 3/2005 | Florencio et al. | |
| 2007/0094031 A1 * | 4/2007 | Chen | 704/267 |
| 2007/0177620 A1 | 8/2007 | Ohmuro et al. | |

FOREIGN PATENT DOCUMENTS

| | | |
|---|---|---|
| EP | 0 743 773 | 11/1996 |
| EP | 1 515 310 | 3/2005 |
| EP | 1 750 397 | 2/2007 |

OTHER PUBLICATIONS

International Application No. PCT/FI2007/050562, Form PCT/ISA/210 (4 sheets) dated Feb. 26, 2008.
"Binaural cue Coding—Part I: Psychoacoustic Fundamentals and Design Principles" by Frank Baumgarte et al; IEEE Transactions on Speech and Audio Processing, vol. 11, No. 6, Nov. 2003.
"Binaural Cue Coding—Part II: Schemes and Applications" by Christof Faller et al; IEEE Transactions on Speech and Audio Processing, vol. 11, No. 6, Nov. 2003.

* cited by examiner

*Primary Examiner*—Daniel D Abebe

(57) ABSTRACT

A method and related apparatus comprising: buffering an encoded audio input signal comprising at least one combined signal of a plurality of audio channels and one or more corresponding sets of side information parameters describing a multi-channel sound image; changing the length of at least one audio frame of said combined signal by adding or removing a segment of said combined signal; modifying said one or more sets of side information parameters with a change corresponding to the change in the length of said at least one audio frame of said combined signal; and transferring said at least one audio frame of said combined signal with a changed length and said modified one or more sets of side information parameters to a further processing unit.

24 Claims, 4 Drawing Sheets

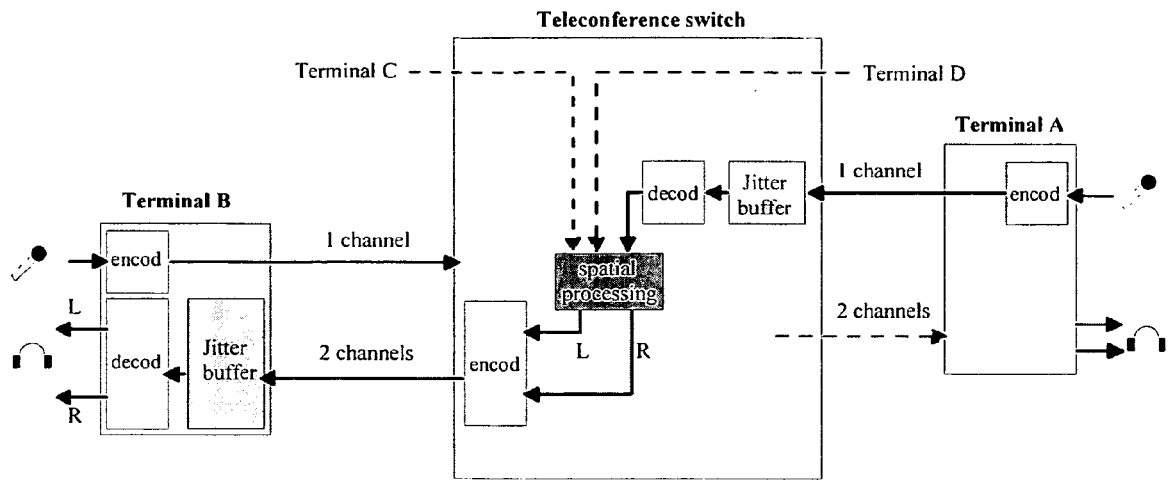
Fig. 3
Audio frame
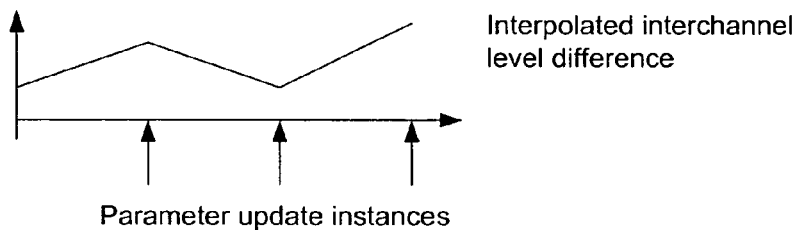
Interpolated interchannel level difference
Fig. 4
Parameter update instances
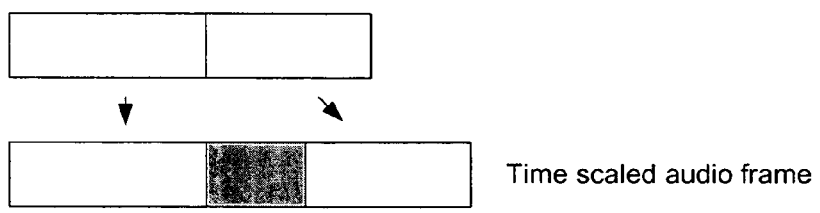
Time scaled audio frame
Fig. 5
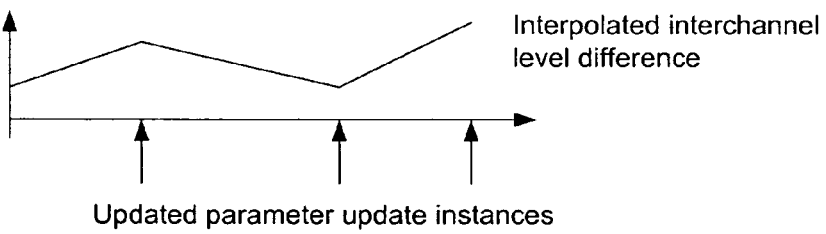
Interpolated interchannel level difference
Updated parameter update instances Time scaled audio frame Interpolated interchannel level difference Updated parameter update instances

TIME SCALING OF MULTI-CHANNEL AUDIO SIGNALS

FIELD OF THE INVENTION

The present invention relates to multi-channel audio signals, and more particularly to time scaling of multi-channel audio signals during audio synthesis.

BACKGROUND OF THE INVENTION

The development of telecommunication networks and services is continuously leading to a situation, wherein finally all services are provided in packet switched networks. The transport of real-time services over packet switched network, especially over wireless links, provides a challenge with variable transmission delay and packet losses. To enable e.g. real-time bi-directional audio services, a buffering scheme is needed in the receiving side to mitigate the delay variations, i.e. network jitter.

Network jitter, caused by the variation in transmission times of the packets, is seen by the receiver as packets arriving at irregular intervals. On the other hand, an audio playback device requires constant input to maintain good sound quality, and no interruptions can be allowed. Typically a jitter buffer is utilized to store incoming frames for a short period of time to hide the irregular arrival times and provide constant input to the decoder and audio playback device. The jitter buffer introduces, however, an additional delay component increasing the end-to-end delay since the received packets are stored before the decoding process. Furthermore, a jitter buffer with a fixed delay is inevitably a compromise between a short enough buffering delay and a low enough number of delayed frames.

To alleviate the problems of a fixed delay jitter buffer, an adaptive jitter buffer can be used for dynamically controlling the balance between short enough delay and low enough number of delayed frames. Thus, the buffering delay is adjusted according to observed changes in the delay behavior. If the transmission delay seems to increase or the jitter condition is getting worse, the buffering is increased to meet the network conditions; if the network jitter condition is improving, the buffering can be reduced. As a result, the overall end-to-end delay is minimized.

Since the audio playback device needs regular input, the buffer adjustment is anything but straightforward. The problem arises from the fact that if the buffering is reduced, the audio signal given to the playback device needs to be shortened to compensate the shortened buffering, and on the other hand, if the buffering is increased, a segment of audio signal needs to be inserted. An advanced solution to this problem is to utilize signal time scaling during active speech. In this approach, the buffer size is reduced when frames are retrieved more frequently due to faster playout. On the other hand, buffer size is increased when frame playout is slowed down.

The challenge in time scale modification during active signal content is to keep the perceived audio quality at a good enough level. Pitch-synchronous mechanisms, such as Pitch Synchronous Overlap-Add (PSOLA), are typically used to provide time scale modification with good voice quality at relatively low complexity. In practice this usually means either repeating or removing full pitch periods of signal and 'smoothing' the point of discontinuity to hide the possible quality defects caused by the time scale modification. Synchronous methods provide good results when used with monophonic and quasi-periodic signals, such as speech.

However, time scaling of multi-channel audio is problematic since even a very small phase difference relative to other channels significantly affects the overall spatial image. Inter channel time differences (ICTD) are crucial for perceptual spatial image reconstruction. Hence, all the channels need to be scaled in a synchronous manner. However, in general multi-channel conditions, e.g. in a teleconference having several speakers talking in different channels at the same time, there is no common pitch for all channels available. Thus, time scaling of a multi-channel teleconference audio signal channel-by-channel-basis would lead to an unfortunate situation where a listener would perceive an audio image, wherein the voices of the conference participants were jumping from one place to another. In addition, the room effect with e.g. reflections makes the problem even more difficult. Thus, the lack of feasible time-scaling methods for multi-channel audio retards the deployment of many spatially encoded audio applications.

SUMMARY OF THE INVENTION

Now there is invented an improved method and technical equipment implementing the method, by which the above problems are alleviated. Various aspects of the invention include a method, an apparatus, a computer program and a module, which are disclosed below. Various embodiments of the invention are disclosed as well.

According to a first aspect, a method according to the invention is based on the idea of buffering an encoded audio input signal comprising at least one combined signal of a plurality of audio channels and one or more corresponding sets of side information parameters describing a multi-channel sound image; changing the length of at least one audio frame of said combined signal by adding or removing a segment of said combined signal; modifying said one or more sets of side information parameters with a change corresponding to the change in the length of said at least one audio frame of said combined signal; and transferring said at least one audio frame of said combined signal with a changed length and said modified one or more sets of side information parameters to a further processing unit.

According to an embodiment, said at least one audio frame of said combined signal with a changed length and said modified one or more sets of side information parameters are transferred in synchronous manner to a further processing unit.

According to an embodiment, said modifying step further comprises: defining at least two update instances, when the value of at least one parameter is determined; and interpolating the value of said at least one parameter for the time between said at least two update instances.

According to an embodiment, the method further comprises: determining the difference of the values of said at least one parameter at said at least two update instances; calculating an interpolation constant on the basis of said difference and time gap between said at least two update instances; and interpolating the value of said at least one parameter for the time between said at least two update instances on the basis of said interpolation constant and the values of said at least one parameter at said at least two update instances.

According to an embodiment, in response to changing the length of at least one audio frame of said combined signal by adding a segment of said combined signal, the method further comprises: adjusting at least one update instance following the point, wherein said segment is added, to a later time instance determined by the length of said segment; and interpolating the value of said at least one parameter for the time between at least one original update instance and the adjusted update instance.

According to an embodiment, in response to changing the length of at least one audio frame of said combined signal by removing a segment of said combined signal, the method further comprises: adjusting at least one update instance during or following the instance, wherein said segment is removed, to an earlier time instance determined by the length of said segment; and interpolating the value of said at least one parameter for the time between at least one original update instance and the adjusted update instance.

According to an embodiment, said segment of said combined signal is a pitch cycle.

The arrangement according to the invention provides significant advantages. The main advantage is that the downmixed sum signal and the corresponding spatial side information remains synchronized, which results in good audio quality also during the time scaling operation because the receiving terminal is able to preserve the spatial image despite of the time scale modification. A further advantage is that the arrangement makes it possible to build an adaptive jitter buffering in the receiving client to minimize latency for spatial audio conferencing applications.

These and the other aspects of the invention and the embodiments related thereto will become apparent in view of the detailed disclosure of the embodiments further below.

BRIEF DESCRIPTION OF THE DRAWINGS

In the following, various embodiments of the invention will be described in more detail with reference to the appended drawings, in which

FIG. 3 shows a simplified block diagram of spatial audio teleconferencing system;

FIG. 4 shows an example of BCC parameter interpolation within an audio frame when no time scaling of the audio frames is utilized;

FIG. 5 shows an example of BCC parameter interpolation within an audio frame, wherein time scaling of the audio frames is utilized;

DETAILED DESCRIPTION OF EMBODIMENTS

As background information for the multi-channel audio coding, the concept of Binaural Cue Coding (BCC) is first briefly introduced as an exemplified platform for implementing the encoding and decoding schemes according to the embodiments. It is, however, noted that the invention is not limited to BCC-type spatial audio coding methods solely, but it can be implemented in any audio coding scheme providing at least one audio signal combined from the original set of a plurality of audio channels and appropriate spatial side information. For example, the invention may be utilized in the MPEG surround coding scheme, which as such takes advantage of the BCC scheme, but extends it further.

Figure 1:
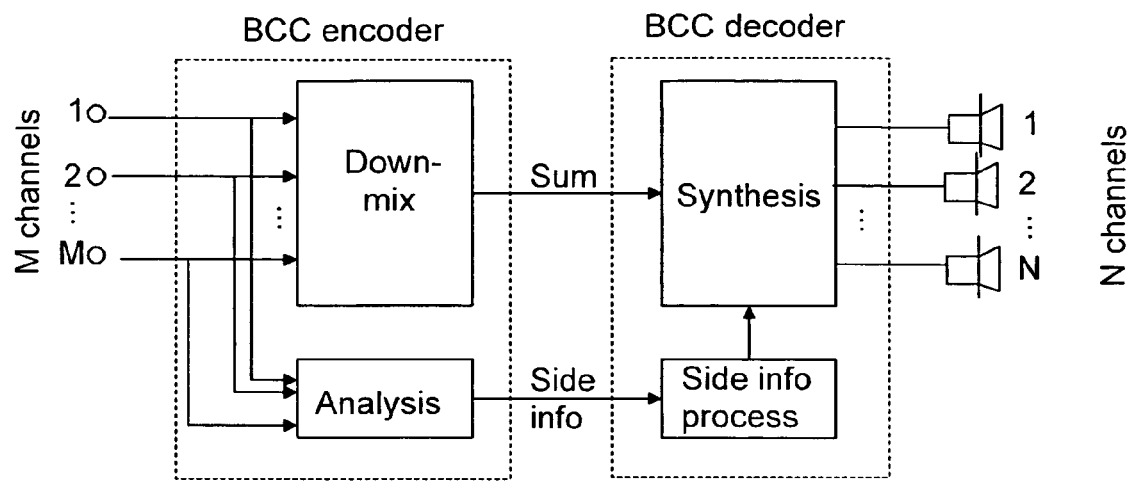
FIG. 1 shows a general concept of Binaural Cue Coding (BCC)

Binaural Cue Coding (BCC) is a general concept for parametric representation of spatial audio, delivering multi-channel output with an arbitrary number of channels from a single audio channel plus some side information. FIG. 1 illustrates this concept. Several (M) input audio channels are combined into a single output (S; "sum") signal by a downmix process. In parallel, the most salient inter-channel cues describing the multi-channel sound image are extracted from the input channels and coded compactly as BCC side information. Both sum signal and side information are then transmitted to the receiver side, possibly using an appropriate low bitrate audio coding scheme for coding the sum signal. On the receiver side, the BCC decoder knows the number (N) of the loudspeakers (either actual loudspeakers or "virtual" loudspeakers in headphone reproduction) as user input. Finally, the BCC decoder generates a multi-channel (N) output signal for loudspeakers from the transmitted sum signal and the spatial cue information by re-synthesizing channel output signals, which carry the relevant inter-channel cues, such as Inter-channel Time Difference (ICTD), Inter-channel Level Difference (ICLD) and Inter-channel Coherence (ICC). Spatial cues are extracted at least once for each analysis frame, in case of transients even more frequently. Therefore, the update frequency information needs to be included within the side information. Typically, the spatial cues are interpolated linearly between the update instances.

BCC schemes result in a bitrate, which is only slightly higher than the bitrate required for the transmission of one audio channel, since the BCC side information requires only a very low bitrate (e.g. 2 kb/s). The multi-channel audio is transmitted over an IP network by multiplexing the compressed downmixed audio with spatial side information within the same stream of RTP packets. Alternatively, a scalable approach is taken by encapsulating the side information in a separate RTP stream. In both cases the receiver needs to synchronize the side information packets to corresponding time instances in the decoded downmixed audio.

Figure 2:
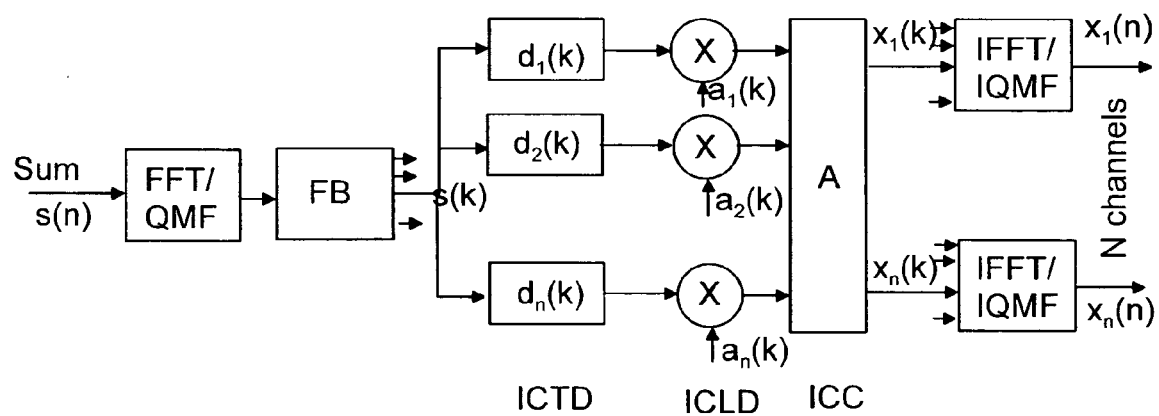
FIG. 2 shows a general structure of a BCC synthesis scheme.

FIG. 2 shows the general structure of a BCC synthesis scheme. The transmitted mono signal ("sum") is first windowed in the time domain into frames and then mapped to a spectral representation of appropriate subbands by a FFT process (Fast Fourier Transform) and a filterbank FB. Alternatively the time-frequency analysis can be done for example with QMF (Quadrature Mirror Filtering) analysis. In the general case of playback channels the ICLD and ICTD are considered in each subband between pairs of channels, i.e. for each channel relative to a reference channel. The subbands are selected such that a sufficiently high frequency resolution is achieved, e.g. a subband width equal to twice the ERB scale (Equivalent Rectangular Bandwidth) is typically considered suitable. For each output channel to be generated, individual time delays ICTD and level differences ICLD are imposed on the spectral coefficients, followed by a coherence synthesis process which re-introduces the most relevant aspects of coherence and/or correlation (ICC) between the synthesized audio channels. Finally, all synthesized output channels are converted back into a time domain representation by an IFFT process (Inverse FFT) or alternatively with inverse QMF filtering, resulting in the multi-channel output. For a more detailed description of the BCC approach, a reference is made to: F. Baumgarte and C. Faller: "*Binaural Cue Coding—Part I: Psychoacoustic Fundamentals and Design Principles*"; IEEE Transactions on Speech and Audio Processing, Vol. 11, No. 6, November 2003, and to: C. Faller and F. Baumgarte: "*Binaural Cue Coding—Part II: Schemes and Applications*", IEEE Transactions on Speech and Audio Processing, Vol. 11, No. 6, November 2003.

In flexible multi-channel synthesis the output could be in any arbitrary channel number N. That is, even though the input contains M channels, the output could be in N channel format. The user may define the number of output channels in the receiving client depending the selected loudspeaker configuration. Accordingly, this can be generalized such that flexible multi-channel systems allow for converting M input audio channels into S combined audio channels and one or more corresponding sets of side information, where M>S, and for generating N output audio channels from the S combined audio channels and the corresponding sets of side information, where N>S, and N may be equal to or different from M.

When applying the multi-channel audio in conversational applications, like multimedia telephony or multi-channel teleconference, the network jitter conditions need to be taken care of with a dedicated jitter buffer. FIG. 3 shows a simplified block diagram of spatial audio teleconferencing system, which is only intended to illustrate the need of jitter buffers in various apparatuses of the teleconferencing system. The teleconferencing system of FIG. 3 includes a teleconference switch and four terminals A-D as conference call participants. The terminal A participating in the conference call sends an encoded microphone signal to the teleconference switch, which maintains a jitter buffer for speech frames received from the terminal A. The teleconference switch decodes the speech signals, processes a 3-D audio representation of the speech signals and then transmits the resulting stereo or multi-channel signal to the participants. A binaural 3-D representation can be created, for example, by applying HRTF (Head related transfer function) processing. Regarding the participants of the conference call, FIG. 3 only illustrates terminal B as a receiving terminal maintaining a jitter buffer for the incoming two-channel binaural signal from the conference switch, but naturally each receiving terminal (conference call participant) needs to maintain a jitter buffer for the incoming multi-channel signal.

In order to cope with the challenges that the jitter buffer management creates in a multi-channel audio environment, the present invention and its embodiments provide a new method to control the multi-channel audio time scaling for adaptive jitter buffer purposes. When the multi-channel audio is coded and transmitted as a compressed downmixed audio and corresponding side information containing the spatial cues, the time scaling in the decoder side needs to be performed for both the downmixed audio and spatial cues before multi-channel audio reconstruction. The methods for adaptive jitter management, known as such, may be used for adding or removing short segments of signal within an audio frame of downmixed multi-channel audio signal. The basic idea is to re-synchronize the side information to the time scaled downmixed audio, i.e. when the time scaling of the downmixed audio adds or removes short segments of signal within the frame, the spatial information update is modified accordingly to keep the spatial image unchanged also during the time scaling operation. The method is especially suitable for speech communication applications with spatial audio.

Figure 6:
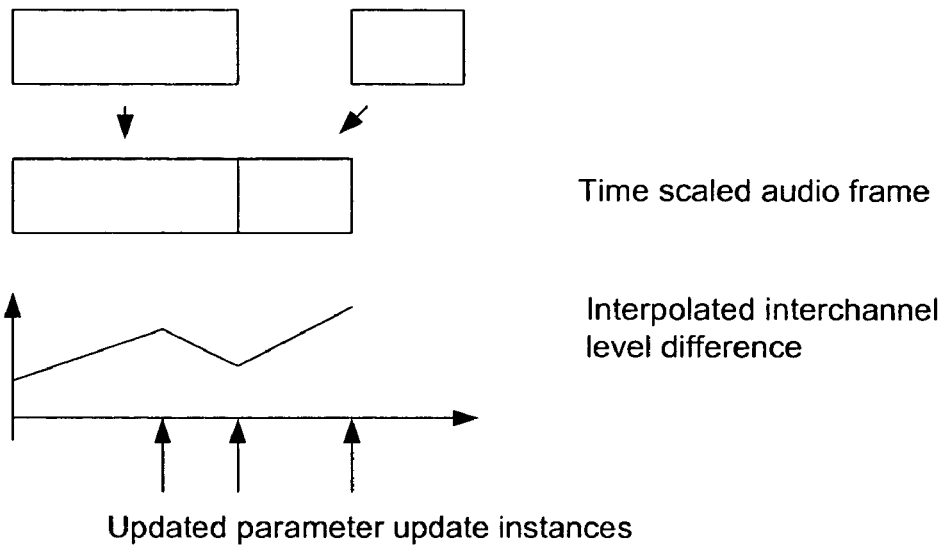
FIG. 6 shows another example of BCC parameter interpolation within an audio frame, wherein time scaling of the audio frames is utilized.

The embodiments of side information scaling for bringing it to correspond with audio frame scaling are now further illustrated in FIGS. 4-6. FIG. 4 presents an example of BCC parameter interpolation within the audio frame when no time scaling of the audio frames is utilized. In this example, an Inter-channel Level Difference (ICLD) parameter is interpolated between the update instances (shown by the arrows) linearly. The other BCC parameters can be processed in a similar manner.

The BCC side information linear interpolation can, for example, be performed such that first the time instances for the BCC parameter update within an audio frame are defined. Then the difference of the BCC parameter values between two adjacent update time instances is determined, and an interpolation constant (alpha) is calculated, according to some predetermined formula, on the basis of the time gap between said two adjacent update time instances and said difference of the BCC parameter values. Finally, the actual linear interpolation is performed on the basis of the interpolation constant (alpha) and the actual BCC parameter values between two adjacent update time instances.

In practice, the BCC side information linear interpolation is preferably carried out as computer software to be executed in a central processing unit CPU or in a dedicated digital signal processor DSP of a data processing device including a BCC decoder. Thus, the BCC parameter linear interpolation between update time instances can be implemented e.g. as follows:

```
update_slot[0] = 0 /* start from the beginning of the frame */
    param_update = 1 . . . num_parameter_set {
        time_slot =update_slot[param_update−1] . . .
        update_slot[param_update]
            {
            diff = update_slot[param_update] −
            update_slot[param_update − 1]
            alpha = (time_slot − update_slot[param_update − 1] + 1) /
            (diff)
            BCC[time_slot] = (1 − alpha)*BCC_old +
            alpha*BCC[param_update]
            }
        BCC_old = BCC[param_update] /* update */
    }
```

FIG. 5 presents an example of BCC parameter interpolation within the audio frame, wherein time scaling of the audio frames is utilized. By adding e.g. a pitch cycle within the frame, the downmixed audio is extended. Now, the BCC parameter interpolation and corresponding update instance needs to be adjusted accordingly. In the example of FIG. 5, the pitch cycle is inserted between the BCC parameter update instances 1 and 2, whereby the update slots after the insertion point need to be modified as follows:

```
update_slot[2] = update_slot[2] + insertion_length
update_slot[3] = update_slot[3] + insertion_length
:
update_slot[N] = update_slot[N] + insertion_length
```

Thus, the update instances after the insertion point are shifted to a later time instance, wherein the shift is determined by length of the pitch cycle (insertion_length). If the above approach is used, the value of the interpolation constant (alpha) changes for the time of the pitch cycle, as can be seen in the above formulas.

According to an alternative embodiment, the interpolation can also be implemented such that the value of alpha is kept constant during the inserted pitch cycle, e.g. by modifying the above formulas as follows:

```
/* before the inserted pitch cycle */
time_slot = update_slot[1] . . . start_of_insertion {
    diff = update_slot[2] − update_slot[1]
```

```
    alpha = (time_slot − update_slot[1] + 1) / (diff)
    BCC[time_slot] = (1 − alpha)*BCC_old + alpha*BCC[2]
}
/* inserted pitch cycle */
time_slot = start_of_insertion + 1 ... end_of_insertion {
    /* note the constant alpha */
    alpha = (start_of_insertion − update_slot[1] + 1) / (diff)
    BCC[time_slot] = (1 − alpha)*BCC_old + alpha*BCC[2]
}
/* after the inserted pitch cycle */
time_slot = end_of_insertion + 1 ... update_slot[2] {
    alpha = (time_slot − length_of_insertion − update_slot[1] + 1)
/ (diff)
    BCC[time_slot] = (1 − alpha)*BCC_old + alpha*BCC[2]
}
BBC_old = BCC[2]
```

The value of alpha, whether it is constant or variable for the time of the pitch cycle, has a slight effect to the interpolation slope, but in any case the interpolation slope becomes gentler between the two adjacent update time instances including the pitch cycle compared to that when no time scaling is being utilized.

The time scaling can also be implemented by removing short segments of signal within an audio frame by e.g. a pitch cycle. Again, the BCC parameter interpolation and corresponding update instance needs to be adjusted accordingly. The example of FIG. 6 shows a situation, wherein the pitch cycle is removed from a location, which contains the BCC parameter update instance 2. According to an embodiment, the update slots after the removed slot are modified as follows:

```
update_slot[2] = start_of removal
update_slot[3] = update_slot[3] − removal length
:
update_slot[N] = update_slot[N] − removal length
```

If more than one parameter update time instance is removed, the latest parameter update or an average of all removed parameter updates are placed in the start of the removal time instance. Now the interpolation slope is steeper before and after the removal point.

```
/* before the removed pitch cycle */
time_slot = update_slot[1] ... start_of_removal {
    diff = start_of_removal − update_slot[1]
    alpha = (time slot − update_slot[1] + 1) / (diff)
    BCC[time_slot] = (1 − alpha)*BCC_old + alpha*BCC[2]
}
BCC_old = BCC[2]
/* after the removed pitch cycle */
time_slot = start of removal + 1 ... (update_slot[3] −
removal_length) {
    diff = (update_slot[3] − removal_length) − start_of_removal
    alpha = (time_slot − start_of_removal + 1) / (diff)
    BCC[time_slot] = (1 − alpha)*BCC_old + alpha*BCC[3]
}
BCC_old = BCC[3]
```

The arrangement according to the invention provides significant advantages. The main advantage is the synchronization of the downmixed sum signal and the corresponding spatial side information, which results in good audio quality also during the time scaling operation because the spatial image is preserved despite of the time scale modification. The arrangement makes it possible to build an adaptive jitter buffering in the receiving client to minimize latency for spatial audio conferencing applications. This has not been possible before.

Any person of skill in the art appreciates that any of the embodiments described above may be implemented as a combination with one or more of the other embodiments, unless there is explicitly or implicitly stated that certain embodiments are only alternatives to each other.

Figure 7:
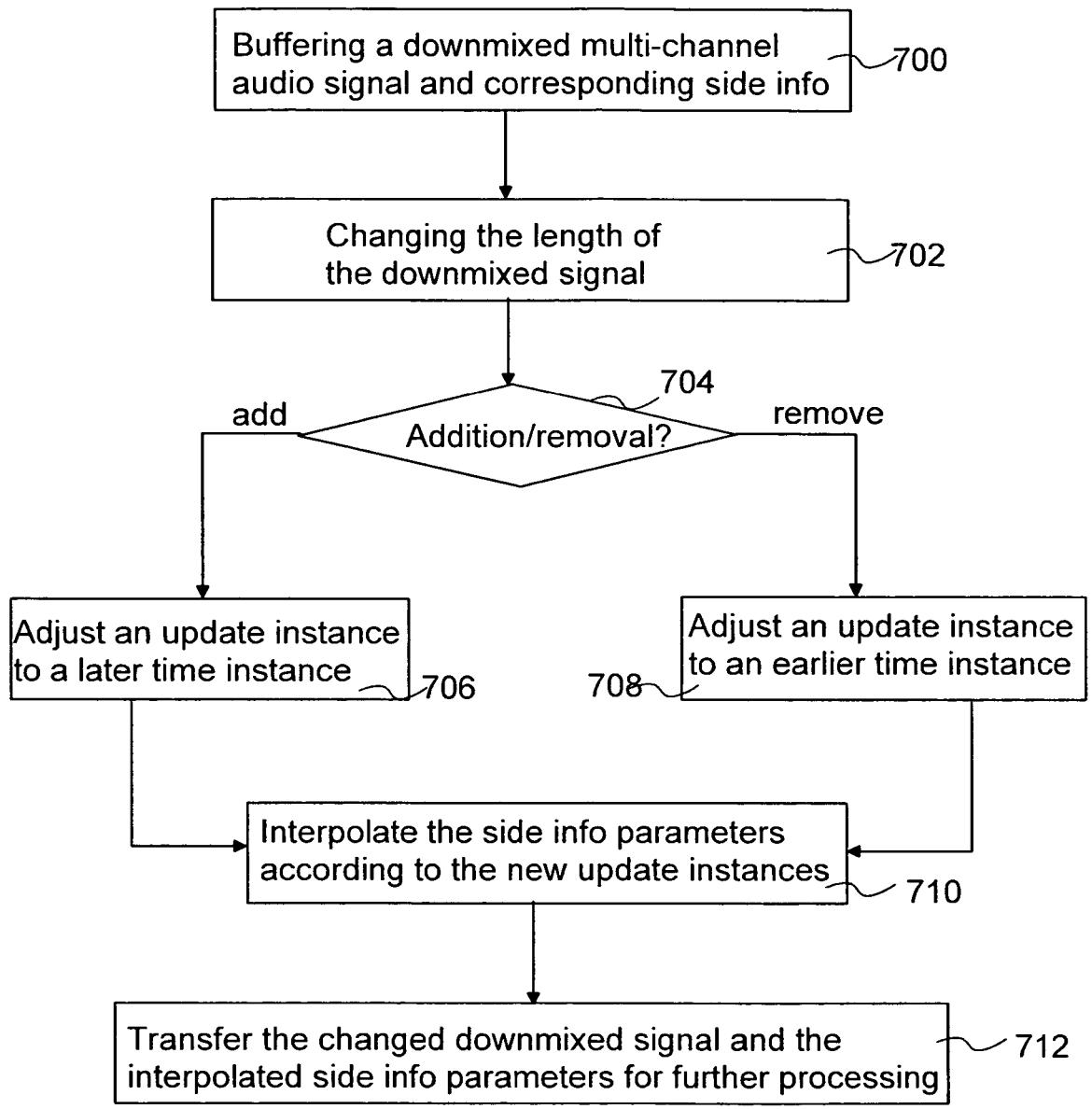
FIG. 7 shows a flow chart of a buffer management method according to an embodiment of the invention.

The basic idea of the invention and some of its embodiments are further illustrated in a flow chart of FIG. 7, which is depicted inform the point of view of the receiving terminal. In the beginning, the terminal receives an encoded audio input signal comprising at least one combined signal of a plurality of audio channels and one or more corresponding sets of side information parameters describing a multi-channel sound image, e.g. a BCC encoded spatial audio signal, which is first inserted into a jitter buffer (700). Then the length of at least one audio frame of the combined signal is changed (702) either by adding or removing a signal segment, e.g. a pitch cycle, from the signal. Now, depending on whether the length was changed by adding or removing (704) a segment of the signal, there exist two alternatives for further processing. If the length of an audio frame of the combined signal is changed by adding a segment, then at least one update instance following the point, wherein said segment is added, is adjusted (706) to a later time instance, the position of which is determined by the length of said segment.

On the other hand, if the length of an audio frame of the combined signal is changed by removing a segment, then at least one update instance during or following the instance, wherein said segment is removed, and any update instance following said removal is adjusted (708) to an earlier time instance, the position of which is determined by the length of said segment. In either case, the values of the side information parameters are interpolated (710) for the time between at least one original update instance and the adjusted update instance (s) following said original update instance. Thereafter, the audio frame of the combined signal with a changed length and the modified one or more sets of side information parameters are transferred (712) preferably, but not necessarily, in a synchronous manner to a further processing unit, e.g. to a BCC decoder. It is noted that the modified side information parameters may also be transferred to the further processing unit separately and asynchronously from the combined signal and the synchronization is then carried out, for example, in the further processing unit or somewhere between the further processing unit and the time scaling unit. This may be the case, for example, if the modifying of the side information parameters is performed in a different unit than the length change of the combined signal.

An apparatus, wherein the embodiments can be implemented may be any kind of data processing device, which is arranged to receive and process a multi-channel audio signal, which is encoded as at least one downmixed (combined) signal and one or more corresponding sets of side information parameters describing the multi-channel sound image. Accordingly, the embodiments are especially applicable in mobile terminals or in other portable device comprising a multi-channel audio decoder, e.g. a BCC decoder, which devices typically lack high-quality loudspeakers, but wherein the features of multi-channel surround sound can be introduced through headphones. A further field of viable applications include teleconferencing services, wherein the receiving terminal can preserve the spatial image despite of the time scale modification, thus allowing the participants of the teleconference to be easily distinguished. Also the teleconference switch typically comprises one or more jitter buffers, as is evident from FIG. 3, whereby the embodiments are equally applicable in a conference switch prior to forming the encoded audio signal comprising at least one combined signal of a plurality of audio channels and one or more corresponding sets of side information parameters describing a multi-channel sound image. The conference switch may receive a multi-channel signal for example from a terminal that comprises a multi-microphone array and is capable of encoding and transmitting a multi-channel signal It is noted that a terminal may also operate as a teleconference switch gathering the audio signals from the participants of the conference call, and then forming and transmitting the encoded audio input signal comprising at least one combined signal of a plurality of audio channels and one or more corresponding sets of side information parameters describing a multi-channel sound image. A terminal may also operate together with the conference switch in a teleconferencing situation, wherein a group of slave terminals participating in a conference call are connected to the conference switch via a master terminal. For example, a plurality of the conference call participants may be gathered in a room, wherein a terminal of one participant operates as the master terminal, which is connected to the conference switch, and the other terminals are connected to the master terminal, for example, via a Bluetooth® connection or a WLAN connection. Then the master terminal receives the multi-channel audio signal with at least one downmixed (combined) signal and one or more corresponding sets of side information parameters describing the multi-channel sound image from the conference switch, processes it accordingly and transmits appropriately time scaled combined signal and side information to each participant.

Figure 8:
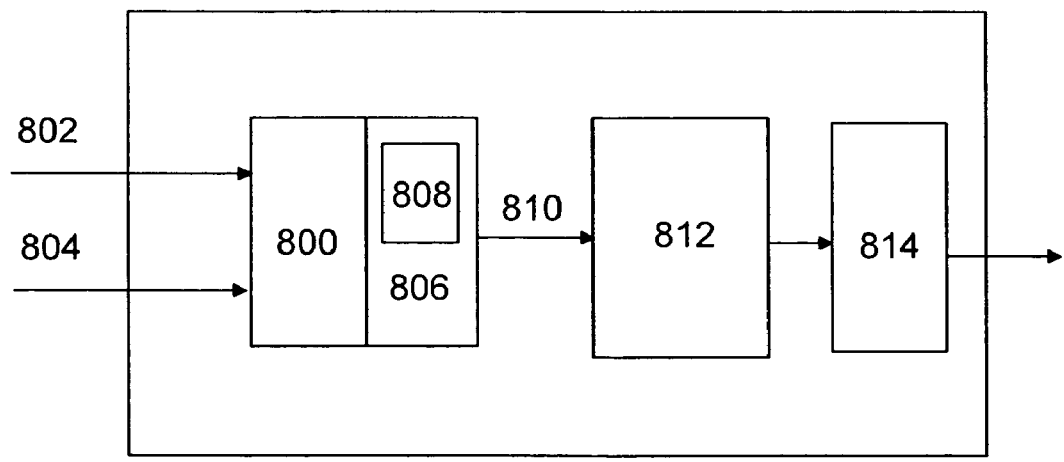
FIG. 8 shows a simplified block diagram of an apparatus according to an embodiment of the invention.

Accordingly, a simplified block chart of an apparatus according to the embodiments is shown in FIG. 8. Such apparatus comprises a jitter buffer (800) for receiving and buffering the at least one downmixed (combined) signal (802) and one or more corresponding sets of side information parameters (804). Furthermore, the apparatus comprises a time scaling unit (806) for changing the length of at least one audio frame of said combined signal by adding or removing a segment of said combined signal, and a side information modifying unit (808) for modifying the side information parameters with a change corresponding to the change in the length of the audio frame of the combined signal. The operation of the time scaling unit (806) and the side information modifying unit (808) may be integrated into a same unit, i.e. in the time scaling unit. However, the side information linear interpolation is not necessarily carried out in a time scaling unit, but it can be performed in another element of the apparatus as well. As one example already mentioned above, the modifying of the side information parameters may be carried out as computer software to be executed in a central processing unit CPU or in a dedicated digital signal processor DSP, which may thus be considered the side information modifying unit.

The apparatus further comprises an interface (810) for transferring the audio frame of said combined signal with a changed length and the modified one or more sets of side information parameters preferably in synchronous manner to a further processing unit (812), which may be e.g. a BCC decoder known as such. Alternatively, the modified side information parameters may be transferred to the further processing unit asynchronously from the combined signal and the synchronization is then carried out, for example, in the decoder. The apparatus may further comprise audio reproduction means (814) for generating the multi-channel surround sound e.g. through headphones.

The jitter buffer and/or the time scaling unit can be implemented in the data processing device as an integral part of the device, i.e. as an embedded structure, or the jitter buffer and/or the time scaling unit may be a separate module together with an audio decoder, which module comprises the required buffer managing functionalities and which is attachable to various kinds of data processing devices. The required buffer managing functionalities may be implemented as a chipset, i.e. an integrated circuit and a necessary connecting means for connecting the integrated circuit to the data processing device.

As described above, the functionalities of the invention, especially those of the time scaling unit, may be implemented in an apparatus, such as a mobile station, also as a computer program which, when executed in a central processing unit CPU or in a dedicated digital signal processor DSP, affects the terminal device to implement procedures of the invention. Functions of the computer program SW may be distributed to several separate program components communicating with one another. The computer software may be stored into any memory means, such as the hard disk of a PC or a CD-ROM disc, from where it can be loaded into the memory of mobile terminal. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC or FPGA circuits, in a hardware module comprising connecting means for connecting the module to an electronic device, or as one or more integrated circuits IC, the hardware module or the ICs further including various means for performing said program code tasks, said means being implemented as hardware and/or software.

It should be understood that the present invention is not limited solely to the above-presented embodiments, but it can be modified within the scope of the appended claims.

The invention claimed is:

1. A method comprising:
    buffering an encoded audio input signal comprising at least one combined signal of a plurality of audio channels and one or more corresponding sets of side information parameters describing a multi-channel sound image,
    changing the length of at least one audio frame of said combined signal by adding or removing a segment of said combined signal,
    modifying said one or more sets of side information parameters with a change corresponding to the change in the length of said at least one audio frame of said combined signal, and
    transferring said at least one audio frame of said combined signal with a changed length and said modified one or more sets of side information parameters to a further processing unit.

2. The method according to claim 1, wherein
    said at least one audio frame of said combined signal with a changed length and said modified one or more sets of side information parameters are transferred in a synchronous manner to a further processing unit.

3. The method according to claim 1, wherein said modifying further comprises:
    defining at least two update instances, when the value of at least one parameter is determined, and interpolating the value of said at least one parameter for the time between said at least two update instances.

4. The method according to claim 3, further comprising:
determining the difference of the values of said at least one parameter at said at least two update instances,
calculating an interpolation constant based on said difference and time gap between said at least two update instances, and
interpolating the value of said at least one parameter for the time between said at least two update instances based on said interpolation constant and the values of said at least one parameter at said at least two update instances.

5. The method according to claim 1, wherein in response to changing the length of at least one audio frame of said combined signal by adding a segment of said combined signal, the method further comprises:
adjusting at least one update instance following the point, wherein said segment is added, to a later time instance determined by the length of said segment, and
interpolating the value of said at least one parameter for the time between at least one original update instance and the adjusted update instance.

6. The method according to claim 1, wherein in response to changing the length of at least one audio frame of said combined signal by removing a segment of said combined signal, the method further comprises:
adjusting at least one update instance during or following the instance, wherein said segment is removed, to an earlier time instance determined by the length of said segment, and
interpolating the value of said at least one parameter for the time between at least one original update instance and the adjusted update instance.

7. The method according to claim 1, wherein said segment of said combined signal is a pitch cycle.

8. An apparatus comprising:
a jitter buffer for buffering an encoded audio input signal comprising at least one combined signal of a plurality of audio channels and one or more corresponding sets of side information parameters describing a multi-channel sound image;
a time scaling unit for changing the length of at least one audio frame of said combined signal by adding or removing a segment of said combined signal;
a side information modifying unit for modifying said one or more sets of side information parameters with a change corresponding to the change in the length of said at least one audio frame of said combined signal; and
an interface for transferring said at least one audio frame of said combined signal with a changed length and said modified one or more sets of side information parameters to a further processing unit.

9. The apparatus according to claim 8, wherein said side information modifying unit is included in said time scaling unit, and
said at least one audio frame of said combined signal with a changed length and said modified one or more sets of side information parameters are arranged to be transferred in a synchronous manner to a further processing unit.

10. The apparatus according to claim 8, wherein said time scaling unit is further arranged to:
define at least two update instances, when the value of at least one parameter is determined; and
said side information modifying unit is arranged to interpolate the value of said at least one parameter for the time between said at least two update instances.

11. The apparatus according to claim 10, wherein said side information modifying unit is further arranged to:
determine the difference of the values of said at least one parameter at said at least two update instances;
calculate an interpolation constant on the basis of said difference and time gap between said at least two update instances; and
interpolate the value of said at least one parameter for the time between said at least two update instances on the basis of said interpolation constant and the values of said at least one parameter at said at least two update instances.

12. The apparatus according to claim 8, wherein in response to said time scaling unit changing the length of at least one audio frame of said combined signal by adding a segment of said combined signal, said time scaling unit is further arranged to:
adjust at least one update instance following the point, wherein said segment is added, to a later time instance determined by the length of said segment; and
said side information modifying unit is arranged to interpolate the value of said at least one parameter for the time between at least one original update instance and the adjusted update instance.

13. The apparatus according to claim 8, wherein in response to said time scaling unit changing the length of at least one audio frame of said combined signal by removing a segment of said combined signal, said time scaling unit is further arranged to:
adjust at least one update instance during or following the instance, wherein said segment is removed, to an earlier time instance determined by the length of said segment; and
said side information modifying unit is arranged to interpolate the value of said at least one parameter for the time between at least one original update instance and the adjusted update instance.

14. The apparatus according to claim 8, wherein said segment of said combined signal is a pitch cycle.

15. The apparatus according to claim 8, wherein said apparatus is a terminal arranged to participate in a teleconference and to receive said encoded audio input signal from a teleconference switch.

16. The apparatus according to claim 8, wherein said apparatus is a teleconference switch arranged to participate in a teleconference and to receive said encoded audio input signal from at least one terminal.

17. A computer program product, stored on a computer readable medium and executable in a data processing device, for managing a buffer memory of the data processing device, the computer program product comprising:
a computer program code section for controlling buffering of an encoded audio input signal comprising at least one combined signal of a plurality of audio channels and one or more corresponding sets of side information parameters describing a multi-channel sound image;
a computer program code section for changing the length of at least one audio frame of said combined signal by adding or removing a segment of said combined signal;
a computer program code section for modifying said one or more sets of side information parameters with a change corresponding to the change in the length of said at least one audio frame of said combined signal; and
a computer program code section for controlling transfer of said at least one audio frame of said combined signal with a changed length and said modified one or more sets of side information parameters in a synchronous manner to a further processing unit.

18. The computer program product according to claim 17, further comprising:
a computer program code section for defining at least two update instances, when the value of at least one parameter is determined; and
a computer program code section for interpolating the value of said at least one parameter for the time between said at least two update instances.

19. The computer program product according to claim 18, further comprising:
a computer program code section for determining the difference of the values of said at least one parameter at said at least two update instances;
a computer program code section for calculating an interpolation constant based on said difference and time gap between said at least two update instances; and
a computer program code section for interpolating the value of said at least one parameter for the time between said at least two update instances on the basis of said interpolation constant and the values of said at least one parameter at said at least two update instances.

20. The computer program product according to claim 17, further comprising:
a computer program code section, responsive to changing the length of at least one audio frame of said combined signal by adding a segment of said combined signal, for adjusting at least one update instance following the point, wherein said segment is added, to a later time instance determined by the length of said segment; and
a computer program code section for interpolating the value of said at least one parameter for the time between at least one original update instance and the adjusted update instance.

21. The computer program product according to claim 17, further comprising:
a computer program code section, responsive to changing the length of at least one audio frame of said combined signal by adding a segment of said combined signal, for adjusting at least one update instance during or following the instance, wherein said segment is removed, to an earlier time instance determined by the length of said segment; and
a computer program code section for interpolating the value of said at least one parameter for the time between at least one original update instance and the adjusted update instance.

22. A module, attachable to a data processing device and comprising an audio decoder, the module further comprising:
a jitter buffer for buffering an encoded audio input signal comprising at least one combined signal of a plurality of audio channels and one or more corresponding sets of side information parameters describing a multi-channel sound image;
a time scaling unit for changing the length of at least one audio frame of said combined signal by adding or removing a segment of said combined signal;
a side information modifying unit for modifying said one or more sets of side information parameters with a change corresponding to the change in the length of said at least one audio frame of said combined signal; and
an interface for transferring said at least one audio frame of said combined signal with a changed length and said modified one or more sets of side information parameters to a further processing unit.

23. The module according to claim 22, wherein:
the module is implemented as a chipset.

24. An apparatus comprising:
means for buffering an encoded audio input signal comprising at least one combined signal of a plurality of audio channels and one or more corresponding sets of side information parameters describing a multi-channel sound image;
means for changing the length of at least one audio frame of said combined signal by adding or removing a segment of said combined signal;
means for modifying said one or more sets of side information parameters with a change corresponding to the change in the length of said at least one audio frame of said combined signal; and
means for transferring said at least one audio frame of said combined signal with a changed length and said modified one or more sets of side information parameters to a further processing unit.

* * * * *

UNITED STATES PATENT AND TRADEMARK OFFICE
CERTIFICATE OF CORRECTION

PATENT NO. : 7,647,229 B2
APPLICATION NO. : 11/584011
DATED : January 12, 2010
INVENTOR(S) : Ojala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Twenty-eighth Day of December, 2010

David J. Kappos
*Director of the United States Patent and Trademark Office*